United States Patent [15] 3,667,334

Brunett [45] June 6, 1972

[54] THIN CONDUCTIVE PLATE LOCATING SYSTEM FOR A PUNCH PRESS

[72] Inventor: Peter Frank Brunett, Rochester, N.Y.

[73] Assignee: Burroughs Corporation, Detroit, Mich.

[22] Filed: May 28, 1970

[21] Appl. No.: 41,508

[52] U.S. Cl. ....................................83/362, 83/364, 83/372, 83/467, 83/577, 83/633

[51] Int. Cl. ....................................B26f 1/02

[58] Field of Search....................83/364, 362, 370, 372, 467, 83/468, 577, 633, 634

[56] References Cited

UNITED STATES PATENTS

| | | | |
|---|---|---|---|
| 2,985,052 | 5/1961 | Mentzer et al. | 83/370 X |
| 2,601,898 | 7/1952 | Vestorsky | 83/372 |
| 2,607,421 | 8/1952 | Anderson | 83/364 X |
| 3,381,559 | 5/1968 | Lefever et al. | 83/61 |

*Primary Examiner*—James M. Meister
*Attorney*—Kenneth L. Miller and Kevin R. Peterson

[57] ABSTRACT

The invention relates to a system for accurately aligning a thin conductive plate relative to a plurality of punch dies for making holes in the plate which are accurately aligned with respect to one edge. The system employs spaced conductive pins on the plate supporting bed of the machine for guiding the plate into position and for indicating that the plate is in position and ready for punching. The plate position sensing and punch control is performed by an electrical circuit which is completed through the locating pins and the conductive plate. Time delay devices are employed in the control circuit to preclude premature operation of the punch due to accidental completion of the sensing circuit during the initial placement of the plate into the punch. The sensing circuit must be closed for an interval of time before the control circuit automatically initiates punching action.

3 Claims, 2 Drawing Figures

PATENTED JUN 6 1972 3,667,334

INVENTOR.
PETER F. BRUNETT
BY Kevin R. Peterson
ATTORNEY

THIN CONDUCTIVE PLATE LOCATING SYSTEM FOR A PUNCH PRESS

BACKGROUND OF THE INVENTION

In offset lithographic printing thin metal plates are surface etched to contain the information to be printed. In multicolor printing several printing plates must be prepared to deposit the individual inks making up the composite print. Each of these printing plates must be accurately prepared and aligned on the press so that the completed image will have proper registration of the different inks.

The usual lithographic printing press contains a plate supporting roll having a cut out portion extending the length of the roll. The edge of the cut out provides a line over which the thin metal plate can be bent and in turn aligned on the plate roll. Within the cut out portion are pins which are passed through holes which are punched along one edge of the printing plate. The pins and edge of the press roll cut out portion provide means for gripping and aligning the plate.

In preparing a new printing plate for mounting on the press roll the plate must be accurately punched with holes in locations corresponding to the positions of the pins in the cut out portion of the press roll. The holes punched in the plate must be accurately positioned relative to one edge of the plate so that each printing plate will be properly aligned on the print roll for accurate registration of the printed image on a sheet.

Increasing demands in the graphic arts industry for precision printing has placed stringent requirements on the location and positioning of punched holes in the printing plate. To date the common method of locating plates for punching is through a mechanical 3 pin or grid line locators. The major disadvantage of this system is the positioning techniques which is manually controlled by the operator's manipulations of the plate and is subject to mechanical positioning errors of ±0.0020. Furthermore, the metal plates being positioned into the punch press are too thin to be forced against the locating pins to make certain the plate is in proper position relative to the punch elements. If the plate is forced against the locating pins, the plate will bend, wrinkle, or buckle. Also, the plates must be inspected to select plates in tolerance.

SUMMARY OF THE INVENTION

The present invention provides a means for accurately locating a printing plate in a punch press and for automatically controlling the operation of a punch press when the printing plate is properly aligned for a predetermined time interval. Since the thin metal plates are conductive, or if nonmetallic can be made conductive through a simple coating procedure, the conductivity is taken advantage of to complete a sensing circuit in the punching machine. The conductive plate is placed on the bed of the punch press and is moved into contact with the locating pins. The locating pins are positioned on the bed of the punch press so that they contact adjacent sides of the plate and in turn hold one edge of the plates relative to the punching elements of the punch press.

Through the application of the punch locating system of the present invention a thin metal plate or conductive nonmetallic plate can be slid along the bed of the punch press until it comes into contact with the spaced locating pins. The plate can then be moved the small amount necessary to complete an electrical circuit through the plate and each of the locating pins to be assured that the plate is in contact with each of the pins.

After the plate has been held in contact with the locating pins for a predetermined interval of time a time delay device is actuated to bridge the circuit provided through the locating pins and to simultaneously actuate the punch mechanism. A second time delay device interrupts the circuit, resetting the first time delay and releasing the punch mechanism. The delay provided by the first time delay device allows the punch operator to move the plate around on the supporting bed where it might prematurely complete the sensing circuit while still being moved. Also, the delay precludes the punch press from continual operation before the already punched plate is removed from contact with the locating pins.

The conductive plate locating and punch control system of the present invention allows a punch operator to automatically punch their conductive plates to within ±0.002 inch. The resulting accuracy permits multiple printing plates to be prepared and used on a press with a minimum of positioning error in multicolor printing.

Lithographic plates are made of aluminum and are approximately 0.006 inch in thickness and are available in several sizes with the 27 × 35 inch size the most commonly used. The plates are too thin to be self-supporting and have little strength so care must be taken in handling them. A plastic or rubber sheet could also be punched in the apparatus of the present invention if it were made conductive through application of a single surface coating such as a conductive paint or electroless plate.

BRIEF DESCRIPTION OF THE DRAWINGS

The invention, both as to its organization and method of operation, together with further objects and advantages thereof, will best be understood by reference to the following detailed description taken in connection with the accompanying drawings, in which.

DESCRIPTION OF PREFERRED EMBODIMENT

Figures 1, 2:
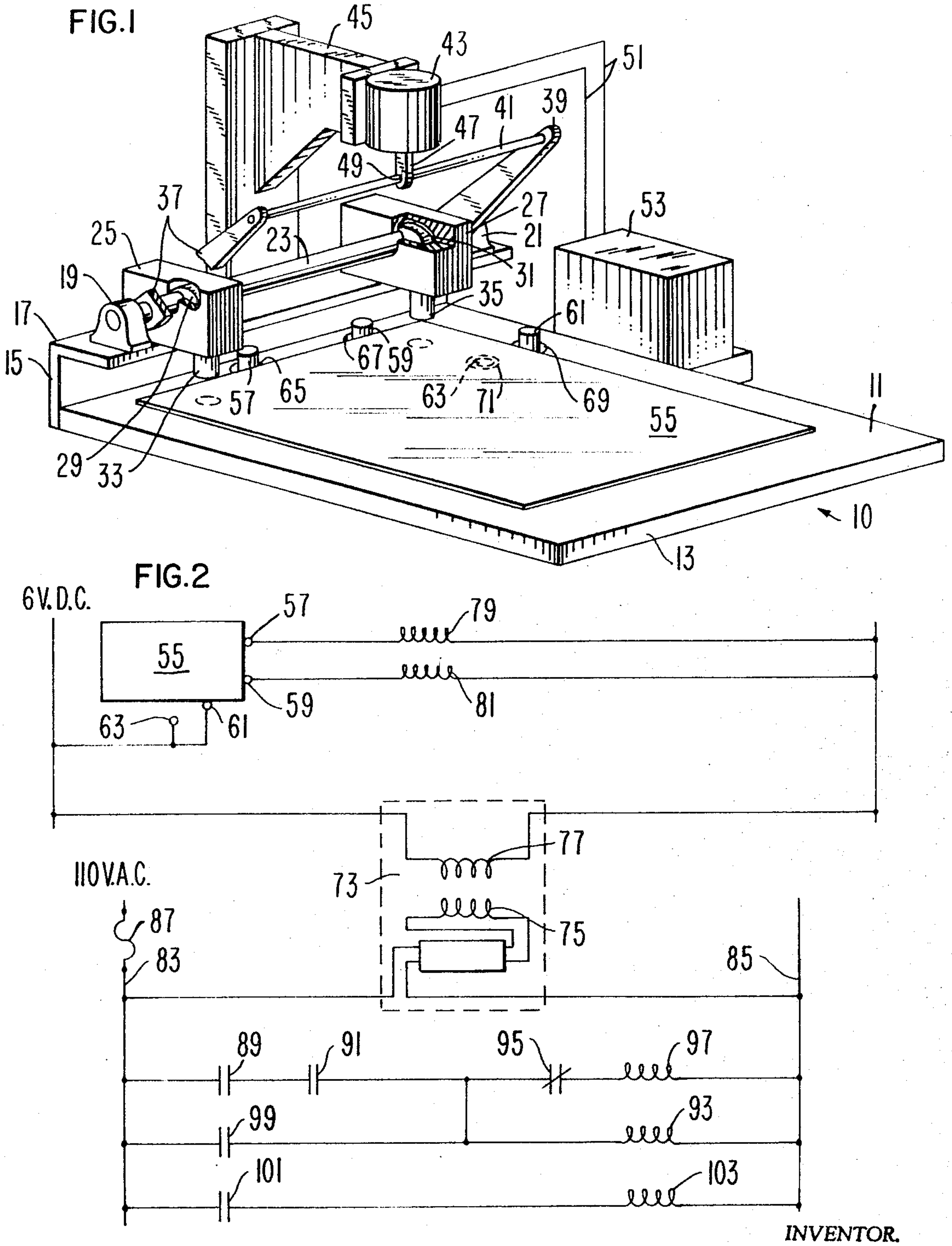
FIG. 1 is a diagramatic perspective view of a punch press equipped with the locating pins and plate sensing and punch control circuit of the present invention.
FIG. 2 is a simplified schematic diagram of the sensing and control circuit used in the plate locating system of the present invention.

Referring to FIG. 1, a punch press is shown and indicated generally by the number 10. The punch press 10 has a flat supporting bed 11 having sides 13. The bed should be large enough to hold the largest plate to be punched. The most common printing plate used at the present time is 27 × 35 inches so the preferred bed size is 30 × 40 inches. Located at the back of the plate supporting bed 11 is a support 15 extending the entire length of and upward from the supporting bed. A shelf 17 is mounted on the support 15 and is spaced from and extends over a portion of the plate supporting bed 11. A pair of spaced bearings 19 and 21 are mounted on the shelf 17 and support a shaft 23 which extends between the bearings. The shaft 23 passes through a pair of spaced punching members 25 and 27 which are also mounted on the shelf 17. Within the punching member 25 and 27 the shaft 23 is equipped with camming elements 29 and 31 for depressing punch elements 33 and 35 when the shaft 23 is rotated clockwise as shown in FIG. 1.

Mounted near each end of the shaft 23 are lever arms 37 and 39 which support a cross shaft 41. The lever arms 37 and 39 and cross shaft 41 provide a handle which can be used to manually rotate the shaft 23 to depress the punch elements 33 and 35. For automatic operation a solenoid 43 is mounted on a support 45 which is mounted on and extends vertically from shelf 17. The solenoid 43 has an armature 47 having an aperture 49 through which the cross shaft 41 passes. Electrical wires 51 connect the solenoid 43 to the sensing and control circuitry which is contained within the box 53 which is attached to a side portion 13 of the punch press.

A plate 55 to be punched is shown on the plate supporting bed 11 of the punch press. The plate 55 is in contact with locating pins 57, 59, and 61. The pins are made from a conductive metal preferably steel for good wear resistance and are one-fourth inch in diameter and 1 inch long. When in position the pins project above the surface of the punch bed approximately one-fourth inch. The pins are fixed to grip a corner of a plate. The pins 57 and 59 are spaced approximately 8 inches apart and are offset from the corner approximately 2 inches. The pin 61 is about 4 inches from the corner. An additional locating pin is shown at 63, in phantom. The pin 63 is approximately 2 inches from pin 61, however this distance can be varied to meet any type of punching requirements. If it is desired to move the punch location a fixed distance along a common punch line relative to one side of the plate 55 a pin located at 63 could be brought into electrical contact with the plate. Each of the locating pins 57, 59, 61, and 63 has an insulated supporting bushing 65, 67, 69, and 71, respectively, to electrically isolate the locating pins from the plate supporting bed 11. The bushing can be made of nylon, glass, ceramic or other suitable insulating materials. If the plate supporting bed were made of a nonconductive material then it would obviously be unnecessary to provide the insulated bushings. The plate supporting bed 11 can have a plurality of spaced locating pins 61, 63 for varying the position of the plate 55 along a common line relative to the punch elements 33 and 35. Each locating pin similar to 63 which would be beneath the plate 55 can be removed from electrical contact with the plate by either depressing the pin as shown in FIG. 1 or by removing the pin from its associated bushing.

The punch sensing and control circuitry is illustrated schematically in FIG. 2 The plate 55 is shown in contact with locating pins 57, 59, and 61. Locating pin 63 while present is shown out of electrical connection with the plate 55. A power supply 73 is shown having primary and secondary windings 75 and 77, respectively. The output of the power supply is shown as 6 volts D.C. which can be provided by suitable rectifying and filtering means, not shown. While other voltage can be used it is preferred to use as low a voltage as conveniently possible to prevent arcing and reduce electrical shock hazard.

A relay energizing coil 79 is electrically connected to locating pin 57. A second relay energizing coil 81 is electrically connected to locating pin 59. Each of the relay coils is connected to one side of the secondary 77 of power supply 73, the locating pins 61 and 63 are connected to the opposite side of the secondary 77. When a conductive plate 55 is in contact with the locating pins 57, 59, and 61 a circuit is completed through the relay coils and the power supply. The relays shown are of the 6 volt D.C. SPST type. Other voltage ratings could obviously be used to match the particular voltage of the power supply.

The primary winding 75 of the power supply 73 is connected to each side of a primary power source 83 and 85. The primary power source can be the conventional 110 volt A.C. commercial supply. A fuse 87, rated at 1 amp, is electrically connected in series with one side of the primary power source 83 to protect the electrical circuit elements.

Each of the relays 79 and 81 in the plate sensing portion of the circuit have associated normally open contacts 89 and 91, respectively. The relay contacts 89 and 91 are connected in series from one side of the primary power source 83 to the opposite side 85 through a parallel circuit containing the energizing coil of a normally closed time delay relay 93 in one leg of the parallel circuit and in the opposite leg the normally closed contacts 95 associated with the time delay relay 93 and the energizing coil of a normally open time delay relay 97. The normally open time delay relay 97 has a pair of normally open contacts 99 and 101, respectively. The relay contacts 99 are connected to bridge the relay contacts 89 and 91 when the time delay relay 97 is actuated. The second set of relay contacts 101, associated with the time delay relay 97, are in series from one side of the primary power source 83 to the opposite side 85 through a solenoid winding 103 which controls the operation of the solenoid 43 shown in FIG. 1. Time delay relays 93 and 97 are preferably adjustable so that relay 93 can be set to delay approximately twice as long as relay 97. Delays of 1 and 2 seconds respectively or 1.5 and 3 seconds have been found convenient by punch operators. Obviously, longer or shorter delays could be provided to meet different operating requirements. Relay 93 is a SPDT–110V A.C. relay while relay 97 is a DPDT–110V A.C. relay. Suitable relays are readily available from Meson Electronics, Rochester, New York.

In the sensing and control circuit shown in FIG. 2 the portion of the circuit connected to the secondary of the power supply 73 performs the sensing function while the portion connected to the primary of the power supply 73 performs the control function. When a conductive plate 55 completes the circuit between the locating pins 57, 59, and 61 electrical current flows in the sensing circuit through the secondary of the power supply 73. The passage of current through the relay energizing coils 79 and 81 causes these relays to close their normally opened contacts 89 and 91. When these contacts close, current passes through the normally closed relay contacts 95 and through each of the time delay relays 93 and 97. The time delays of the relays 93 and 97 are selected so that 93 has a longer time delay than 97. After current has passed through the energizing coil 97 for sufficient time to actuate the time delay relay, the relay contacts 99 and 101 close. The relay contacts 99 bridge the closed relay contacts 89 and 91, effectively removing them from the control circuit. These contacts are bridged to prevent any eratic oscillation or chattering of the punch caused by finite movement of the plate 55 away from the locating pins when the punching elements contact and perforate the plate. The closing of the relay contacts 101 cause current to flow through the solenoid 103 to automatically actuate the punch.

While the above steps have been taking place, current has continued to flow through time delay relay 93. On the completion of its time interval relay 93 causes the normally closed contacts 95 to open which in turn interrupt the current flow through the time delay relay 97 resetting this time delay relay and breaking the circuit through the solenoid 103 and the relay bridging contacts 99. The control circuit is now reset to its initial state; and even through the now punched plate 55 remains on the punch bed, the punch will not reactivate unless the plate 55 is left in contact with the locating pins for a time sufficient to cause time delay relay 97 to again actuate.

The time delay provided by the energizing coil 97 allows sufficient time for the plate to be moved about on the punch bed where it can make intermittent contact with the locating pins without the punch operating. If this delay were not provided, an accidental completion of the circuit in the sensing portion could cause the punch to operate while the plate is being moved.

While the sensing and control circuits have been described using relay energizing coils as current sensitive devices, it is obvious that these elements could be replaced with solid state devices, for example, transistors or silicon controlled rectifiers or properly biased vacuum tube devices to perform an identical function. Furthermore, while the invention has been described in relation to the preferred embodiment of a punch press, it is obvious that the same inventive means could be used to control other types of machine tools needing accurate registration of the workpiece relative to the working elements or tools in the machine.

While a particular embodiment of the invention has been shown, it will be understood, of course, that it is not desired that the invention be limited thereto since modifications may be made, and it is, therefore contemplated by the apended claims to cover any such modifications as fall within the true spirit and scope of the invention.

I claim:

1. A conductive plate locating and positioning system for a punch press comprising:
   - a supporting bed for a plate to be punched,
   - punching means above said supporting bed,
   - a pair of spaced, aligned primary locating pins on said supporting bed,
   - at least one secondary locating pin on said supporting bed spaced from and on a line parallel to said primary locating pins, said primary and secondary locating pins being positioned to contact adjacent sides of a plate to be punched to align an edge of the plate under said punching means,
   - a first relay means having an energizing coil and normally open contact means,
   - a second relay means having an energizing coil and normally open contact means, said first and second relay means being electrically connected to separate ones of said primary locating pins, a secondary source of electric current connected to the energizing coil of each of said first and second relay means and to said secondary locating pin, said primary and secondary locating pins forming a completed electrical circuit through a conductive plate, said relay means and said secondary source of electric current, a primary source of electric current connected to and serving to energize said secondary source of current, a first time delay relay having an energizing coil and first and second normally open contact means, a second time delay relay, of greater delay time than said first time delay relay and having an energizing coil and normally closed contact means, said contact means of said first and second relay means connected in series with said normally closed contact means, of said second time delay relay, and the energizing coil of said first time delay relay across said primary source of electric current, said contact means of said first and second relay means and said first normally open contact means of said first time delay relay being connected in parallel and in series with the energizing coil of said second time delay relay across said primary source of electric current, an actuating solenoid for said punch means, said second normally open contact means on said first time delay relay being connected in series with said actuating solenoid for said punch means, whereby the completion of the electrical circuit across said secondary source of electric current by a conductive plate causes said first and second relay means to close thereby causing current to pass through said first time delay relay and said secondary time delay relay for a time sufficient to actuate said first time delay relay and in turn the actuating solenoid for said punch means, the continuing flow of current actuating said secondary time delay relay to break the circuit to said first time delay relay to thereby release said actuating solenoid for said punch means.

2. A workpiece locating device for a machine tool comprising:

workpiece locating means for aligning a workpiece within a machine tool relative to a punching means, comprising spaced, aligned primary locating pins and spaced aligned secondary locating pins on the workpiece supporting bed of the machine tool, said secondary locating pins being aligned on a line parallel to and spaced from said primary locating pins, said primary and secondary locating pins being positioned to contact adjacent sides of material to be punched, sensing means electrically connected to said locating means for determining that a workpiece is present in the machine tool and in proper position for having work done thereon, comprising a current sensing means electrically connected to each of the primary locating pins, a power source, and circuit means electrically connecting said primary and secondary locating pins through said sensing means and power source when a conductive workpiece is in contact with said locating pins, and control means for actuating the machine tool when a workpiece is determined by said current sensing means to be present in and in proper position for actuating said punching means, comprising a first and second time delay means, said time delay means being initially energized under the control of said sensing means, said first time delay means bypassing said sensing means and actuating said punching means on completion of its time delay interval, said second time delay means resetting said first time delay means on completion of its time delay interval.

3. A workpiece locating device for a machine tool comprising:

workpiece locating means for aligning a workpiece within a machine tool relative to a punching means, comprising spaced, aligned primary locating pins and spaced aligned secondary locating pins on the workpiece supporting bed of the machine tool, said secondary locating pins being aligned on a line parallel to and spaced from said primary locating pins, said primary and secondary locating pins being positioned to contact adjacent sides of material to be punched, said secondary plate locating means being adapted to be removed from electrical contact with said workpiece so as to vary the working location on the workpiece along a line parallel to one edge of said workpiece and wherein said primary and secondary locating pins are electrically isolated from the supporting structure of the machine tool, sensing means electrically connected to said locating means for determining that a workpiece is present in the machine tool and in proper position for having work done thereon, comprising a current sensing means electrically connected to each of the primary locating pins, a power source, and circuit means electrically connecting said primary and secondary locating pins through said sensing means and power source when a conductive workpiece is in contact with said locating pins, and control means for actuating the machine tool when a workpiece is determined by said current sensing means to be present in and in proper position for actuating said punching means, comprising a first and second time delay means, said time delay means being initially energized under the control of said sensing means, said first time delay means bypassing said sensing means and actuating said punching means on completion of its time delay interval, said second time delay means resetting said first time delay means on completion of its time delay interval.

* * * * *